Patented Aug. 20, 1929.

1,725,394

UNITED STATES PATENT OFFICE.

PAUL DIETERLE, OF BUFFALO, NEW YORK, ASSIGNOR TO NATIONAL ANILINE & CHEMICAL COMPANY, INC., OF NEW YORK, N. Y., A CORPORATION OF NEW YORK.

PROCESS OF MAKING 2-NAPHTHOL-3-CARBOXYLIC ACID.

No Drawing. Application filed October 31, 1927. Serial No. 230,183.

This invention relates to improvements in the manufacture of a 2-naphthol-carboxylic acid, particularly 2-naphthol-3-carboxylic acid.

The process heretofore generally employed for the production of 2-naphthol-3-carboxylic acid comprises heating, in the presence or absence of a diluent or a solvent, an alkali metal salt of beta-naphthol to an elevated temperature in an atmosphere of carbon dioxide under a pressure greater than atmospheric. In general, the yield of 2-naphthol-3-carboxylic acid is relatively poor.

The process contemplated by the present invention for the production of 2-naphthol-3-carboxylic acid comprises subjecting dry sodium beta-naphtholate, or other alkali metal beta-naphtholate, in the absence of a solvent or a diluent, and under ordinary atmospheric pressure, to the action of carbon dioxide at an initial temperature of about 120° to 175° C., preferably about 150° C., and completing the reaction at a final temperature of about 225° to 285° C., preferably about 250° C. The 2-naphthol-3-carboxylic acid is subsequently recovered in any suitable manner from the resultant product thus obtained. In carrying out the process, it is advantageous to keep the reaction mass thoroughly mixed and well agitated during its contact with the carbon dioxide in order to expose and bring fresh surfaces of the mass into reaction and also to effect an even and uniform distribution of temperature throughout the mass during all stages of the reaction. For this purpose, it has been found advantageous to carry out the reaction in a heated ball-mill equipped in any suitable manner with appropriate means for charging and discharging, measuring temperatures, introducing gas, etc. A rotating drum containing loose balls, surrounded by a heating jacket, and having axial openings which may be used for the introduction and exit of gases or vapors and as a thermometer tube, serves as a suitable apparatus. Such an apparatus will thoroughly agitate the material by impingement, trituration and impact. The apparatus employed, however, forms no part of the present invention.

The following specific example will further illustrate the invention, but it will be understood that the invention is not limited thereto. The parts are by weight.

Example: 500 parts of dry sodium beta-naphtholate, heated and maintained at a temperature of about 150° C. in a rotating drum placed in a gas oven, and equipped with loose balls, appropriate devices for measuring temperature, and suitable inlet and outlet openings exposed to atmospheric pressure, is treated under ordinary atmospheric pressure for 4 to 6 hours with dry carbon dioxide gas, the gas being passed into the drum at such a rate that a small amount of it escapes from the apparatus. The rotated reaction-mass, still under atmospheric pressure, is then further heated to a temperature of about 250° C., and maintained at this point for about 4 to 6 hours, while a slow current of carbon dioxide is maintained in contact with it. After cooling, the reaction-mass is treated with water, the solution filtered, and the 2-naphthol-3-carboxylic acid recovered from the filtrate and separated from any beta-naphthol present by any suitable and well known method. The 2-naphthol-3-carboxylic acid thus obtained is substantially free from other naphthol-carboxylic acids.

In the above example, during the action of the carbon dioxide on the sodium beta-naphtholate, about 10 to 15 parts of beta-naphthol distil from the reaction-mixture and are carried out of the apparatus along with a small amount of carbon dioxide which escapes. This beta-napthol may be collected in any suitable manner.

It may be pointed out that the apparatus used for the practice of this invention may also serve as the apparatus for the production of the beta-naptholate which is used in the process of the invention. For example, beta-naphthol and the required amount of aqueous caustic soda solution are mixed in a rotating drum or ball-mill and evaporated to dryness, and finally heated to elevated temperatures to effect dehydration while a current of inert gas, or vapors of a boiling liquid such as toluene, are passed through the apparatus.

It will thus be seen that the present invention contemplates the production of 2-napthol-3-carboxylic acid by subjecting a well mixed and thoroughly agitated dry alkali metal salt of beta-naphthol, particularly sodium beta-naphtholate, to the action of dry carbon dioxide under atmospheric pressure preferably at an initial temperature of about 120° to 175° C. and at a final temperature of about 225° to 285° C. Although the reaction may be carried out from beginning to end at a temperature of about 225° to 285° C., it has been found that carbon dioxide is more rapidly absorbed under atmospheric pressure by dry sodium beta-naphtholate at temperatures around 120° to 175° C. than it is at temperatures higher or lower than this.

It will also be noted that the use of elevated temperatures at atmospheric pressure, instead of at super-atmospheric pressure, in the carbonation of dry alkali metal beta-naphtholates, favors the production of 2-naphthol-3-carboxylic acid in good yields of excellent quality, there being formed very little, if any, other naphthol-carboxylic acids.

I claim:

1. In the manufacture of 2-napthol-3-carboxylic acid by a process which comprises subjecting a dry alkali metal salt of beta-naphthol to the action of carbon dioxide at a temperature ranging from about 120° to 285° C., the improvement which comprises carrying out the process under atmospheric pressure.

2. In the manufacture of 2-naphthol-3-carboxylic acid by a process which comprises subjecting dry sodium beta-naphtholate to the action of dry carbon dioxide, the improvement which comprises carrying out the process under atmospheric pressure and at a temperature ranging from about 120° to 175° C.

3. In the manufacture of 2-naphthol-3-carboxylic acid by a process which comprises subjecting dry sodium beta-naphtholate to the action of dry carbon dioxide, the improvement which comprises carrying out the process under atmospheric pressure and at a temperature first of about 120°–175° C., and then of about 225°–285° C.

4. In the manufacture of 2-naphthol-3-carboxylic acid by a process which comprises subjecting dry sodium beta-naphtholate to the action of dry carbon dioxide, the improvement which comprises carrying out the process under atmospheric pressure and at a temperature first of about 150° C. and then of about 250° C.

5. In the manufacture of 2-naphthol-3-carboxylic acid by a process which comprises subjecting dry sodium beta-naphtholate to the action of dry carbon dioxide at a temperature of about 120°–285° C.; the improvement which comprises carrying out the process under atmospheric pressure and removing beta-naphthol from the reaction mixture during the heating operation.

6. In the manufacture of 2-naphthol-3-carboxylic acid, the process which comprises subjecting dry sodium beta-naphtholate under atmospheric pressure to the action of dry carbon dioxide at a temperature of about 150° C. and then at a temperature of about 250° C., and during the heating operation keeping the reaction mixture well stirred and agitated by impingement, trituration, and impact.

In testimony whereof I affix my signature.

PAUL DIETERLE.